(12) United States Patent
Xu (10) Patent No.: US 11,711,774 B2
(45) Date of Patent: Jul. 25, 2023

(54) INFORMATION INDICATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 120 days.

(21) Appl. No.: 17/094,270

(22) Filed: Nov. 10, 2020

(65) Prior Publication Data

US 2021/0084604 A1   Mar. 18, 2021

Related U.S. Application Data

(63) Continuation of application No. PCT/CN2018/086583, filed on May 11, 2018.

(51) Int. Cl.
*H04W 56/00* (2009.01)
*H04W 72/04* (2023.01)
(Continued)

(52) U.S. Cl.
CPC ......... *H04W 56/001* (2013.01); *H04L 5/0094* (2013.01); *H04W 72/0453* (2013.01); *H04W 72/23* (2023.01)

(58) Field of Classification Search
None
See application file for complete search history.

(56) References Cited

U.S. PATENT DOCUMENTS 8,428,016 B2   4/2013 Bhattad et al.
9,497,732 B2   11/2016 Bhattad et al.
(Continued)

FOREIGN PATENT DOCUMENTS

CN   102090109 A   6/2011
CN   106793058 A   5/2017
CN   107846731 A   3/2018

OTHER PUBLICATIONS

LG Electronics: "Remaining Details on PBCH design and contents". 3GPP Draft; R1-1804534 LG_Remaining Details on PBCH Design and Contents Final, 3rd Generation Partnership Project (3GPP). Mobile Competence Centre; 650, Route Des Lucioles; F-06921 Sophia-Antipolis, vol. RAN WG1, No. Sanya, P.R. China; Apr. 16, 2018-2018042015, XP051426803.

(Continued)

*Primary Examiner* — Saba Tsegaye
(74) *Attorney, Agent, or Firm* — Ladas & Parry LLP (57) ABSTRACT

An information indication method and device, and a computer storage medium are provided. Said method comprises: a terminal device receiving a synchronization signal block (SSB) sent by a network device; the terminal device acquiring indication information according to frequency domain location information of the SSB, the indication information being used to indicate the attributes of a frequency band to which the SSB belongs, and the attributes of the frequency band comprising at least one of the following: an identifier of the frequency band, a minimum channel bandwidth, a subcarrier spacing of the SSB, and a subcarrier spacing of a physical downlink control channel (PDCCH).

12 Claims, 3 Drawing Sheets

---

201 — A terminal device receives a Synchronization Signal Block (SSB) transmitted by a network device 202 — The terminal device obtains indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a Physical Downlink Control Channel (PDCCH)

(51) Int. Cl.
*H04L 5/00* (2006.01)
*H04W 72/0453* (2023.01)
*H04W 72/23* (2023.01)

(56) References Cited

U.S. PATENT DOCUMENTS

| | | | |
|---|---|---|---|
| 2010/0008317 A1 | 1/2010 | Bhattad | |
| 2013/0094427 A1 | 4/2013 | Bhattad et al. | |
| 2018/0103445 A1 | 4/2018 | Akkarakaran et al. | |
| 2018/0131487 A1 | 5/2018 | Ly et al. | |
| 2019/0200307 A1* | 6/2019 | Si | H04L 27/2666 |
| 2020/0359343 A1* | 11/2020 | Da | H04J 11/0069 |
| 2021/0014805 A1* | 1/2021 | Tang | H04W 56/001 |

OTHER PUBLICATIONS

VIVO: "Discussion on NR sync raster shift for frequency range 0-2700MHz". 3GPP Draft, R4-1804076, Discussion on NR Sync Raster Shift, 3rd Generation Partnership Project (3GPP), Mobile Competence Centre; 650, Route Des Lucioles; F-06921 Sophia-Antipolis Cedex; France vol. RAN WG4, No. Melbourne, AU; Apr. 16, 2018-Apr. 20, 2018, XP051417881.
Supplementary European Search Report in the European application No. 18918135.7, dated Apr. 12, 2021.
Written Opinion of the International Search Authority in the international application No. PCT/CN2018/086583, dated Jan. 8, 2019.
International Search Report in the international application No. PCT/CN2018/086583, dated Jan. 8, 2019.
RAN WG1, "LS on RMSI CORESET configuration for a band with 15kHz SSB SCS and 10MHz minimum channel bandwidth", 3GPP TSG RAN WG4 Meeting #87 R4-1806105, May 21-25, 2018.
First Office Action of the Chinese application No. 201880084700.X, dated Nov. 25, 2022.

* cited by examiner

A network device transmits a Synchronization Signal Block (SSB) to a terminal device, to enable the terminal device to obtain indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a Physical Downlink Control Channel (PDCCH)

INFORMATION INDICATION METHOD AND DEVICE, AND COMPUTER STORAGE MEDIUM

CROSS-REFERENCE TO RELATED APPLICATION

This is a continuation application of International Patent Application No. PCT/CN2018/086583, filed on May 11, 2018, entitled "Information Indication Method and Device, and Computer Storage Medium", the disclosure of which is hereby incorporated by reference in its entirety.

BACKGROUND

For a wireless spectrum in New Radio (NR), a frequency-domain position of a Synchronization Signal Block (SSB) is defined through a synchronization raster. For different frequency ranges, frequency-domain positions of synchronization rasters are determined through different formulas.

However, when there is an overlapping part between two frequency bands, positions of synchronization rasters in an overlapping frequency-domain range of the two frequency bands may be completely the same. For an initial access terminal, when an SSB is monitored at the position of the synchronization raster in a frequency-domain overlapping region, it is impossible to determine which frequency band the detected SSB belongs to, and the terminal cannot confirm a manner for subsequently transmitting and receiving signals.

SUMMARY

The disclosure relates to the technical field of wireless communication, and particularly to a method and device of indicating information and a computer storage medium.

According to an embodiment of the disclosure, there is provided a method of indicating information. The method may include the following operations.

A terminal device receives an SSB transmitted by a network device.

The terminal device obtains indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a Physical Downlink Control Channel (PDCCH).

In the embodiment of the disclosure, the operation that the terminal device obtains the indication information according to the frequency-domain position information of the SSB may include the following operations.

Responsive to detecting that a frequency-domain position of the SSB corresponds to a first synchronization raster, the terminal device determines that the attribute of the frequency band that the SSB belongs to is an attribute of a first frequency band.

Responsive to detecting that the frequency-domain position of the SSB corresponds to a second synchronization raster, the terminal device determines that the attribute of the frequency band that the SSB belongs to is an attribute of a second frequency band.

Each of the first synchronization raster and the second synchronization raster may be a synchronization raster in an overlapping bandwidth of the first frequency band and the second frequency band, a position of the first synchronization raster may be determined based on a first formula, and a position of the second synchronization raster may be determined based on a second formula.

In the embodiment of the disclosure, responsive to that the first frequency band and the second frequency band are positioned in a first frequency range, the position of the first synchronization raster may be determined based on a formula $N*1,200$ kHz+$M*50$ kHz, $N=1:2,499$, and the position of the second synchronization raster may be determined based on a formula $N*1,200$ kHz+$M'*50$ kHz, $N=1:2,499$ or a formula $N*1,200$ kHz+$M*50$ kHz+Offset1, $N=1:2,499$, values of M and M' being different and Offset1 being a first offset.

Responsive to that the first frequency band and the second frequency band are positioned in a second frequency range, the position of the first synchronization raster may be determined based on a formula $3,000$ Mhz+$N*1.44$ MHz, $N=0:14,756$, and the position of the second synchronization raster may be determined based on a formula $3,000$ MHz+$N*1.44$ MHz+Offset2, $N=0:14,756$, Offset2 being a second offset.

In the embodiment of the disclosure, the operation that the terminal device obtains the indication information according to the frequency-domain position information of the SSB may include the following operation.

Responsive to detecting that the frequency-domain position of the SSB corresponds to a third synchronization raster, the terminal device determines that the attribute of the frequency band that the SSB belongs to is an attribute of a second frequency band.

The third synchronization raster may be a synchronization raster in an overlapping bandwidth of the second frequency band and a first frequency band; and an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band may be the third synchronization raster.

In the embodiment of the disclosure, the operation that the terminal device obtains the indication information according to the frequency-domain position information of the SSB may include the following operation.

Responsive to detecting that the frequency-domain position of the SSB corresponds to the third synchronization raster, the terminal device determines that the attribute of the frequency band that the SSB belongs to is an attribute of a second frequency band.

The third synchronization raster may be a synchronization raster in an overlapping bandwidth of the second frequency band and a first frequency band; a position of the third synchronization raster may be determined based on a first formula and a second spacing of a synchronization raster corresponding to the second frequency band; and a synchronization raster, except the third synchronization raster, in the synchronization rasters, which are determined based on the first formula and a first spacing of a synchronization raster corresponding to the first frequency band, in the overlapping frequency bandwidth may be a synchronization raster corresponding to the first frequency band.

In the embodiment of the disclosure, the operation that the terminal device obtains the indication information according to the frequency-domain position information of the SSB may include the following operation.

Responsive to detecting that the frequency-domain position of the SSB corresponds to a fourth synchronization raster, the terminal device determines that the attribute of the frequency band that the SSB belongs to is an attribute of a first frequency band.

The fourth synchronization raster may be a synchronization raster in an overlapping bandwidth of the first frequency band and a second frequency band; the fourth synchronization raster may be determined based on a first frequency-domain position and a third offset; and an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band, may be the first frequency-domain position.

According to an embodiment of the disclosure, there is provided a method of indicating information. The method may include the following operation.

A network device transmits an SSB to a terminal device, to enable the terminal device to obtain indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a PDCCH.

In the embodiment of the disclosure, the operation that the network device transmits the SSB to the terminal device may include the following operations.

The network device transmits the SSB to the terminal device on a first synchronization raster, to enable the terminal device to, responsive to detecting that a frequency-domain position of the SSB corresponds to a first synchronization raster, determine that the attribute of the frequency band that the SSB belongs to is an attribute of a first frequency band; or, the network device transmits the SSB to the terminal device on a second synchronization raster, to enable the terminal device to, responsive to detecting that the frequency-domain position of the SSB corresponds to a second synchronization raster, determine that the attribute of the frequency band that the SSB belongs to is an attribute of a second frequency band.

Each of the first synchronization raster and the second synchronization raster may be a synchronization raster in an overlapping bandwidth of the first frequency band and the second frequency band, a position of the first synchronization raster may be determined based on a first formula, and a position of the second synchronization raster may be determined based on a second formula.

In the embodiment of the disclosure, responsive to that the first frequency band and the second frequency band are positioned in a first frequency range, the position of the first synchronization raster may be determined based on a formula $N*1,200$ kHz$+M*50$ kHz, $N=1:2,499$, and the position of the second synchronization raster may be determined based on a formula $N*1,200$ kHz$+M'*50$ kHz, $N=1:2,499$ or a formula $N*1,200$ kHz$+M*50$ kHz$+$Offset1, $N=1:2,499$, values of M and M' being different and Offset1 being a first offset.

Responsive to that the first frequency band and the second frequency band are positioned in a second frequency range, the position of the first synchronization raster may be determined based on a formula 3,000 Mhz$+N*1.44$ MHz, $N=0:14,756$, and the position of the second synchronization raster may be determined based on a formula 3,000 MHz$+N*1.44$ MHz$+$Offset2, $N=0:14,756$, Offset2 being a second offset.

In the embodiment of the disclosure, the operation that the network device transmits the SSB to the terminal device may include the following operation.

The network device transmits the SSB to the terminal device on a third synchronization raster, to enable the terminal device to, responsive to detecting that the SSB is on the third synchronization raster, determine that the attribute of the frequency band that the SSB belongs to is an attribute of a second frequency band.

The third synchronization raster may be a synchronization raster in an overlapping bandwidth of the second frequency band and a first frequency band; and an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band, may be the third synchronization raster.

In the embodiment of the disclosure, the operation that the network device transmits the SSB to the terminal device may include the following operation.

The network device transmits the SSB to the terminal device on a third synchronization raster, to enable the terminal device to, responsive to detecting that the SSB is on the third synchronization raster, determine that the attribute of the frequency band that the SSB belongs to is an attribute of a second frequency band.

The third synchronization raster may be a synchronization raster in an overlapping bandwidth of the second frequency band and a first frequency band; a position of the third synchronization raster may be determined based on a first formula and a second spacing of a synchronization raster corresponding to the second frequency band; and a synchronization raster, except the third synchronization raster, in the synchronization rasters, which are determined based on the first formula and a first spacing of a synchronization raster corresponding to the first frequency band, in the overlapping bandwidth, may be a synchronization raster corresponding to the first frequency band.

In the embodiment of the disclosure, the operation that the network device transmits the SSB to the terminal device may include the following operation.

The network device transmits the SSB to the terminal device on a fourth synchronization raster, to enable the terminal device to, responsive to detecting that the SSB is on the fourth synchronization raster, determine that the attribute of the frequency band that the SSB belongs to is an attribute of a first frequency band.

The fourth synchronization raster may be a synchronization raster in an overlapping bandwidth of the first frequency band and a second frequency band; the fourth synchronization raster may be determined based on a first frequency-domain position and a third offset; and an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band, may be the first frequency-domain position.

According to an embodiment of the disclosure, there is provided a device of indicating information. The device may include a receiving unit and an acquisition unit.

The receiving unit may be configured to receive an SSB transmitted by a network device.

The acquisition unit may be configured to obtain indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a PDCCH.

In the embodiment of the disclosure, the acquisition unit may include a first determination subunit.

The first determination subunit may be configured to, responsive to detecting that a frequency-domain position of the SSB corresponds to a first synchronization raster, determine that the attribute of the frequency band that the SSB belongs to is an attribute of a first frequency band, and responsive to detecting that the frequency-domain position of the SSB corresponds to a second synchronization raster, determine that the attribute of the frequency band that the SSB belongs to is an attribute of a second frequency band.

Each of the first synchronization raster and the second synchronization raster may be a synchronization raster in an overlapping bandwidth of the first frequency band and the second frequency band, a position of the first synchronization raster may be determined based on a first formula, and a position of the second synchronization raster may be determined based on a second formula.

In the embodiment of the disclosure, responsive to that the first frequency band and the second frequency band are positioned in a first frequency range, the position of the first synchronization raster may be determined based on a formula N*1,200 kHz+M*50 kHz, N=1:2,499, and the position of the second synchronization raster may be determined based on a formula N*1,200 kHz+M'*50 kHz, N=1:2,499 or a formula N*1,200 kHz+M*50 kHz+Offset1, N=1:2,499, values of M and M' being different and Offset1 being a first offset.

Responsive to that the first frequency band and the second frequency band are positioned in a second frequency range, the position of the first synchronization raster may be determined based on a formula 3,000 Mhz+N*1.44 MHz, N=0:14,756, and the position of the second synchronization raster may be determined based on a formula 3,000 MHz+N*1.44 MHz+Offset2, N=0:14,756, Offset2 being a second offset.

In the embodiment of the disclosure, the acquisition unit may include a second determination subunit.

The second determination subunit may be configured to, responsive to detecting that the frequency-domain position of the SSB corresponds to a third synchronization raster, determine that the attribute of the frequency band that the SSB belongs to is an attribute of a second frequency band.

The third synchronization raster may be a synchronization raster in an overlapping bandwidth of the second frequency band and a first frequency band; and an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band, may be the third synchronization raster.

In the embodiment of the disclosure, the acquisition unit may include a third determination subunit.

The third determination subunit may be configured to, responsive to detecting that the frequency-domain position of the SSB corresponds to the third synchronization raster, determine that the attribute of the frequency band that the SSB belongs to is an attribute of a second frequency band.

The third synchronization raster may be a synchronization raster in an overlapping bandwidth of the second frequency band and a first frequency band; a position of the third synchronization raster may be determined based on a first formula and a second spacing of a synchronization raster corresponding to the second frequency band; and a synchronization raster, except the third synchronization raster, in the synchronization rasters, which are determined based on the first formula and a first spacing of a synchronization raster corresponding to the first frequency band, in the overlapping bandwidth may be a synchronization raster corresponding to the first frequency band.

In the embodiment of the disclosure, the acquisition unit may include a fourth determination subunit.

The fourth determination subunit may be configured to, responsive to detecting that the frequency-domain position of the SSB corresponds to a fourth synchronization raster, determine that the attribute of the frequency band that the SSB belongs to is an attribute of a first frequency band.

The fourth synchronization raster may be a synchronization raster in an overlapping bandwidth of the first frequency band and the second frequency band; the fourth synchronization raster may be determined based on a first frequency-domain position and a third offset; and an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band, may be the first frequency-domain position.

According to an embodiment of the disclosure, there is provided a device of indicating information. The device may include a transmitting unit.

The transmitting unit may be configured to transmit an SSB to a terminal device, to enable the terminal device to obtain indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a PDCCH.

In the embodiment of the disclosure, the transmitting unit may include a first transmitting subunit.

The first transmitting subunit may be configured to transmit the SSB to the terminal device on a first synchronization raster, to enable the terminal device to, responsive to detecting that a frequency-domain position of the SSB corresponds to the first synchronization raster, determine that the attribute of the frequency band that the SSB belongs to is an attribute of a first frequency band, or, transmit the SSB to the terminal device on a second synchronization raster, to enable the terminal device to, responsive to detecting that the frequency-domain position of the SSB corresponds to a second synchronization raster, determine that the attribute of the frequency band that the SSB belongs to is an attribute of a second frequency band.

Each of the first synchronization raster and the second synchronization raster may be a synchronization raster in an overlapping bandwidth of the first frequency band and second frequency band, a position of the first synchronization raster may be determined based on a first formula, and a position of the second synchronization raster may be determined based on a second formula.

In the embodiment of the disclosure, responsive to that the first frequency band and the second frequency band are positioned in a first frequency range, the position of the first synchronization raster may be determined based on a formula $N*1{,}200\text{ kHz}+M*50\text{ kHz}$, $N=1{:}2{,}499$, and the position of the second synchronization raster may be determined based on a formula $N*1{,}200\text{ kHz}+M'*50\text{ kHz}$, $N=1{:}2{,}499$ or a formula $N*1{,}200\text{ kHz}+M*50\text{ kHz}+\text{Offset1}$, $N=1{:}2{,}499$, values of M and M' being different and Offset1 being a first offset.

Responsive to that the first frequency band and the second frequency band are positioned in a second frequency range, the position of the first synchronization raster may be determined based on a formula $3{,}000\text{ Mhz}+N*1.44\text{ MHz}$, $N=0{:}14{,}756$, and the position of the second synchronization raster may be determined based on a formula $3{,}000\text{ MHz}+N*1.44\text{ MHz}+\text{Offset2}$, $N=0{:}14{,}756$, Offset2 being a second offset.

In the embodiment of the disclosure, the transmitting unit may include a second transmitting subunit.

The second transmitting subunit may be configured to transmit the SSB to the terminal device on a third synchronization raster, to enable the terminal device to, responsive to detecting that the SSB is on the third synchronization raster, determine that the attribute of the frequency band that the SSB belongs to is an attribute of a second frequency band.

The third synchronization raster may be a synchronization raster in an overlapping bandwidth of the second frequency band and a first frequency band; and an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band, may be the third synchronization raster.

In the embodiment of the disclosure, the transmitting unit may include a third transmitting subunit.

The third transmitting subunit may be configured to transmit the SSB to the terminal device on a third synchronization raster, to enable the terminal device to, responsive to detecting that the SSB is on the third synchronization raster, determine that the attribute of the frequency band that the SSB belongs to is an attribute of a second frequency band.

The third synchronization raster may be a synchronization raster in an overlapping bandwidth of the second frequency band and a first frequency band; a position of the third synchronization raster may be determined based on a first formula and a second spacing of a synchronization raster corresponding to the second frequency band; and a synchronization raster, except the third synchronization raster, in the synchronization rasters, which are determined based on the first formula and a first spacing of a synchronization raster corresponding to the first frequency band, in the overlapping bandwidth may be a synchronization raster corresponding to the first frequency band.

In the embodiment of the disclosure, the transmitting unit may include a fourth transmitting subunit.

The fourth transmitting subunit may be configured to transmit the SSB to the terminal device on a fourth synchronization raster, to enable the terminal device to, responsive to detecting that the SSB is on the fourth synchronization raster, determine that the attribute of the frequency band that the SSB belongs to is an attribute of a first frequency band.

The fourth synchronization raster may be a synchronization raster in an overlapping bandwidth of the first frequency band and the second frequency band; the fourth synchronization raster may be determined based on a first frequency-domain position and a third offset; and an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band, may be the first frequency-domain position.

According to an embodiment of the disclosure, there is provided a computer storage medium, on which computer-executable instructions may be stored, the computer-executable instruction being executed by a processor to implement the method of indicating information.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

In order to make the technical solutions of the embodiments of the disclosure convenient to understand, technologies related to the embodiments of the disclosure will be described below.

1) SSB

Figure 1:
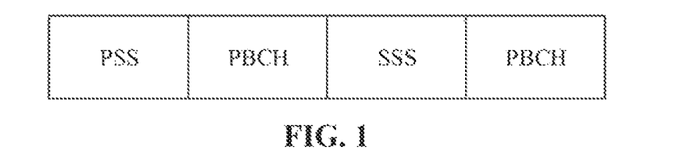
FIG. 1 is a schematic composition diagram of an SSB.

A common channel and signal, for example, a Synchronization Signal (SS) and a broadcast channel, in a 5th-Generation (5G) NR system need to cover a whole cell in a multi-beam scanning manner, to facilitate the reception by User Equipment (UE) in the cell. In NR, SSB is defined. An SSB is configured to carry an SS and broadcast channel of a beam. An SSB includes a Primary Synchronization Signal (PSS) of one symbol, a Secondary Synchronization Signal (SSS) of one symbol and a New Radio Access Technology-Physical Broadcast Channel (NR-PBCH) of two symbols, as illustrated in FIG. 1.

2) Synchronization Raster

For a wireless spectrum in NR, a frequency-domain position of an SSB is defined through a synchronization raster. In different frequency ranges, frequency-domain positions of synchronization rasters are determined through formulas in Table 1. In a frequency range 0-3,000 MHz, the frequency-domain position of the synchronization raster is calculated by use of a formula 1. In a frequency range 3,000-24,250 MHz, the frequency-domain position of the synchronization raster is calculated by use of a formula 2.

TABLE 1

| Frequency range | Frequency-domain position of the SS block: $SS_{REF}$ | GSCN | GSCN range |
|---|---|---|---|
| 0-3000 MHz | N*1,200 kHz + M*50 kHz, N = 1: 2,499, M ∈ {1, 3, 5} (Note 1) Formula 1 | [3N + (M − 3)/2] | [2-7,498] |
| 3000-24250 MHz | 3,000 MHz + N*1.44 MHz N = 0: 14,756 Formula 2 | [7,499 + N] | [7,499-22,255] |

(Note 1):
The default value for operating frequency bands with SCS spaced channel raster is M = 3.

On the other hand, frequency bands defined in NR are illustrated in Table 2. Band n38 and band n41 overlap in a frequency domain. In combination with Table 1, frequency-domain ranges of n38 and n41 belong to 0-3,000 MHz, and positions of synchronization rasters in the frequency-domain ranges are determined through the formula 1 in Table 1. In an overlapping frequency-domain range of the band n38 and band n41, the positions of the synchronization rasters are completely the same. For initial access UE, when an SSB is monitored at the position of the synchronization raster in a frequency-domain overlapping region, it is impossible to determine whether a frequency band that the detected SSB belongs to is n38 or n41.

TABLE 2

| NR frequency band | Uplink frequency band (for BS reception/ UE transmission) $F_{UL\_low}$-$F_{UL\_high}$ | Downlink frequency band (for BS transmission/ US reception) $F_{DL\_low}$-$F_{DL\_high}$ | Duplex mode |
|---|---|---|---|
| n1 | 1,920 MHz-1,980 MHz | 2,110 MHz-2,170 MHz | FDD |
| n2 | 1,850 MHz-1,910 MHz | 1,930 MHz-1,990 MHz | FDD |
| n3 | 1,710 MHz-1,785 MHz | 1,805 MHz-1,880 MHz | FDD |
| n5 | 824 MHz-849 MHz | 869 MHz-894 MHz | FDD |
| n7 | 2,500 MHz-2,570 MHz | 2,620 MHz-2,690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2,570 MHz-2,620 MHz | 2,570 MHz-2,620 MHz | TDD |
| n41 | 2,496 MHz-2,690 MHz | 2,496 MHz-2,690 MHz | TDD |
| n50 | 1,432 MHz-1,517 MHz | 1,432 MHz-1,517 MHz | TDD |
| n51 | 1,427 MHz-1,432 MHz | 1,427 MHz-1,432 MHz | TDD |
| n66 | 1,710 MHz-1,780 MHz | 2,110 MHz-2,200 MHz | FDD |
| n70 | 1,695 MHz-1,710 MHz | 1,995 MHz-2,020 MHz | FDD |
| n71 | 663 MHz-698 MHz | 617 MHz-652 MHz | FDD |
| n74 | 1,427 MHz-1,470 MHz | 1,475 MHz-1,518 MHz | FDD |
| n75 | N/A | 1,432 MHz-1,517 MHz | SDL |
| n76 | N/A | 1,427 MHz-1,432 MHz | SDL |
| n78 | 3,300 MHz-3,800 MHz | 3,300 MHz-3,800 MHz | TDD |
| n77 | 3,300 MHz-4,200 MHz | 3,300 MHz-4,200 MHz | TDD |
| n79 | 4,400 MHz-5,000 MHz | 4,400 MHz-5,000 MHz | TDD |
| n80 | 1,710 MHz-1,785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1,920 MHz-1,980 MHz | N/A | SUL |

According to Table 3, for the synchronization rasters in the frequency-domain ranges of n38 and n41, a spacing of a synchronization raster defined for n38 is 1, and a spacing of a synchronization raster defined for n41 is 9. Therefore, in the frequency-domain overlapping region of n38 and n41, every ninth synchronization raster in n38 overlaps with a synchronization raster in n41.

TABLE 3

| NR frequency band | Subcarrier spacing of the SS Bloc | SS Block pattern[1] | GSCN range (First-<Step size>-Last) |
|---|---|---|---|
| n1 | 15 kHz | Case A | [5,279-<1>-5,419] |
| n2 | 15 kHz | Case A | [4,829-<1>-4,969] |
| n3 | 15 kHz | Case A | [4,517-<1>-4,693] |
| n5 | 15 kHz | Case A | [2,177-<1>-2,230] |
|  | 30 kHz | Case B | [2,183-<1>-2,224] |
| n7 | 15 kHz | Case A | [6,554-<1>-6,718] |
| n8 | 15 kHz | Case A | [2,318-<1>-2,395] |
| n20 | 15 kHz | Case A | [1,982-<1>-2,047] |
| n28 | 15 kHz | Case A | [1,901-<1>-2,002] |
| n38 | 15 kHz | Case A | [6,431-<1>-6,544] |
| n41 | 15 kHz | Case A | [6,246-<9>-6,714] |
|  | 30 kHz | Case C | [6,252-<3>-6,714] |
| n50 | 15 kHz | Case A | [3,584-<1>-3,787] |
| n51 | 15 kHz | Case A | [3,572-<1>-3,574] |
| n66 | 15 kHz | Case A | [5,279-<1>-5,494] |
|  | 30 kHz | Case B | [5,285-<1>-5,488] |
| n70 | 15 kHz | Case A | [4,993-<1>-5,044] |
| n71 | 15 kHz | Case A | [1,547-<1>-1,624] |
| n74 | 15 kHz | Case A | [3,692-<1>-3,790] |
| n75 | 15 kHz | Case A | [3,584-<1>-3,787] |
| n76 | 15 kHz | Case A | [3,572-<1>-3,574] |
| n77 | 30 kHz | Case C | [7,711-<1>-8,329] |
| n78 | 30 kHz | Case C | [7,711-<1>-8,051] |
| n79 | 30 kHz | Case C | [8,480-<16>-8,880] |

NOTE:
[1]SS Block pattern is defined in section 4.1 in [TS 38.213]

Since the band n38 and band n41 correspond to different minimum channel bandwidths, the minimum channel bandwidth corresponding to n38 being 5 MHz and the minimum channel bandwidth corresponding to n41 being 10 MHz. If the UE cannot determine the frequency band through the received SSB, the minimum channel bandwidth cannot be determined, and RMSI cannot be accurately received according to indication information of an RMSI-Control Resource Set (CORESET) carried in a Master Information Block (MIB).

Since frequency-domain positions of synchronization rasters in different bands overlap, the LIE cannot determine a frequency band through a frequency-domain position of a synchronization raster corresponding to a searched SSB. The embodiments of the disclosure disclose a method for determining a frequency band that the SSB belongs to through a synchronization raster of an SSB.

The solutions of the embodiments of the disclosure will be described below in combination with specific embodiments in detail.

In the embodiments of the disclosure, a terminal device may also be called UE, an access terminal, a user unit, a user Station (ST), a mobile ST, a mobile radio ST, a remote ST, a remote terminal, a mobile device, a user terminal, a terminal, a wireless communication device, a user agent or a user device. The terminal device may be an ST in a Wireless Local Area Network (WLAN), and may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle device, a wearable device, a terminal device in a next-generation communication system, for example, a future 5G network, a terminal device in a future evolved Public Land Mobile Network (PLMN) or the like. In the embodiments of the disclosure, the terminal device may also be a wearable device. The wearable device may also be called a wearable intelligent device and is a generic term of wearable devices obtained by performing intelligence design and development on daily wearing products, for example, glasses, gloves, watches, clothes and shoes.

In the embodiments of the disclosure, a network device may be a device configured to communicate with a mobile device, and the network device may be an Access Point (AP) in the WLAN, a Base Transceiver Station (BTS) in Global System for Mobile communication (GSM) or Code Division Multiple Access (CDMA), may also be a NodeB (NB) in Wideband Code Division Multiple Access (WCDMA), and may further be an Evolutional Node B (eNB or eNodeB) in Long Term Evolution (LTE), or a relay ST or AP, or a vehicle device, a wearable device, a network device in an NR network, a network device in the future evolved PLMN or the like.

Figure 2:
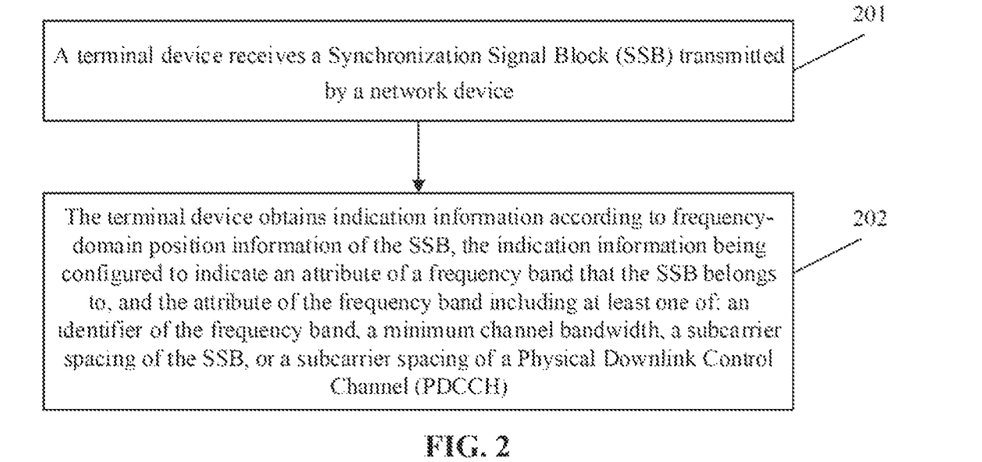
FIG. 2 is a first schematic flowchart of a method of indicating information according to an embodiment of the disclosure.

FIG. 2 is a first schematic flowchart of a method of indicating information according to an embodiment of the disclosure. As illustrated in FIG. 2, the method of indicating information includes the following operations.

In block 201, a terminal device receives an SSB transmitted by a network device.

In block 202, the terminal device obtains indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a PDCCH.

In the embodiments of the disclosure, the terminal device obtains the indication information according to a position of a synchronization raster where the detected SSB is located. Specifically, the indication information may be obtained in the following manners.

A first manner: responsive to detecting that a frequency-domain position of the SSB corresponds to a first synchronization raster, the terminal device determines that the attribute of the frequency band that the SSB belongs to is an attribute of a first frequency band; and responsive to detecting that the frequency-domain position of the SSB corresponds to a second synchronization raster, the terminal device determines that the attribute of the frequency band that the SSB belongs to is an attribute of a second frequency band. Each of the first synchronization raster and the second synchronization raster is a synchronization raster in an overlapping bandwidth of the first frequency band and the second frequency band, a position of the first synchronization raster is determined based on a first formula, and a position of the second synchronization raster is determined based on a second formula.

In the embodiment of the disclosure, considering that the two frequency bands (called the first frequency band and the second frequency band in the embodiment of the disclosure) may have an overlapping part, different position calculation methods for synchronization raster (synchronization raster definitions) are adopted in the overlapping bandwidth of the first frequency band and the second frequency band, to meet the requirement that the positions of the synchronization rasters of the first frequency band and the second frequency band in the overlapping bandwidth do not overlap. The terminal device, when detecting the SSB, may determine whether the frequency band that the SSB belongs to is the first frequency band or the second frequency band according to the position of the synchronization raster where the SSB is positioned.

During specific implementation, if an original formula of determining synchronization raster position for the first frequency band is the same as an original formula of determining synchronization raster position for the second frequency band, an offset may be introduced to distinguish positions of synchronization rasters of the two frequency bands in the overlapping bandwidth.

Responsive to that the first frequency band and the second frequency band are positioned in a first frequency range (for example, 0-3,000 MHz in Table 1), the position of the first synchronization raster is determined based on a formula N*1,200 kHz+M*50 kHz, N=1:2,499, and the position of the second synchronization raster is determined based on a formula N*1,200 kHz+M'*50 kHz, N=1:2,499 or a formula N*1,200 kHz+M*50 kHz+Offset1, N=1:2,499, values of M and M' being different and Offset1 being a first offset.

Responsive to that the first frequency band and the second frequency band are positioned in a second frequency range (for example, 3,000-24,250 MHz), the position of the first synchronization raster is determined based on a formula 3,000 Mhz+N*1.44 MHz, N=0:14,756, and the position of the second synchronization raster is determined based on a formula 3,000 MHz+N*1.44 MHz+Offset2, N=0:14,756, Offset2 being a second offset.

For example, according to Table 1, both n38 and n41 belong to 0-3,000 MHz, and positions of synchronization rasters are determined by using a formula N*1,200 kHz+M*50 kHz, N=1:2,499, M∈{1,3,5}. In an overlapping bandwidth of n38 and n41, the positions of the synchronization rasters of n38 and n41 are determined by using different formulas respectively. For example, for n38, the position of the synchronization raster is determined by using a formula N*1,200 kHz+M*50 kHz, N=1:2,499, M∈{1,3,5}; and for n41, the position of the synchronization raster is determined by using a formula N*1,200 kHz+M'*50 kHz, N=1:2,499, M'∈{7,9,11} or by using a formula N*1,200 kHz+M*50 kHz+Offset, N=1:2,499, M∈{1,3,5}, Offset being, for example, 100 kHz.

A second manner: responsive to detecting that the frequency-domain position of the SSB corresponds to a third synchronization raster, the terminal device determines that the attribute of the frequency band that the SSB belongs to is an attribute of a second frequency band. The third synchronization raster is a synchronization raster in an overlapping bandwidth of the second frequency band and the first frequency band; and an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band is the third synchronization raster.

According to Table 3, for synchronization rasters in frequency-domain ranges of n38 and n41, a spacing of a synchronization raster defined for n38 is 1, and a spacing of a synchronization raster defined for n41 is 9. Therefore, in a frequency-domain overlapping region of n38 and n41, every ninth synchronization raster in n38 overlaps with a synchronization raster in n41. At frequency-domain positions of these overlapping synchronization rasters, it is specified that UE considers the frequency band corresponding to the detected SSB to be n41, but not n38.

A third manner: responsive to detecting that the frequency-domain position of the SSB corresponds to the third synchronization raster, the terminal device determines that the attribute of the frequency band that the SSB belongs to is an attribute of a second frequency band. The third synchronization raster is a synchronization raster in an overlapping bandwidth of the second frequency band and the first frequency band; a position of the third synchronization raster is determined based on a first formula and a second spacing of a synchronization raster corresponding to the second frequency band; and a synchronization raster, except the third synchronization raster, in the synchronization rasters, which are determined based on the first formula and a first spacing of a synchronization raster corresponding to the first frequency band, in the overlapping bandwidth is a synchronization raster corresponding to the first frequency band.

According to Table 3, for the synchronization rasters in the frequency-domain ranges of n38 and n41, the spacing of a synchronization raster defined for n38 is 1, and the spacing of a synchronization raster defined for n41 is 9. Therefore, in the frequency-domain overlapping region of n38 and n41, every ninth synchronization raster in n38 overlaps with a synchronization raster in n41. For these overlapping synchronization rasters, it is specified that the synchronization rasters belong to n41 and do not belong to n38. In such case, a frequency band corresponding to the SSB originally detected by the UE on these overlapping synchronization rasters is n41.

A fourth manner: responsive to detecting that the frequency-domain position of the SSB corresponds to a fourth synchronization raster, the terminal device determines that the attribute of the frequency band that the SSB belongs to is an attribute of a first frequency band. The fourth synchronization raster is a synchronization raster in an overlapping bandwidth of the first frequency band and the second frequency band; the fourth synchronization raster is determined based on a first frequency-domain position and a third offset; and an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band, is the first frequency-domain position.

According to Table 3, for the synchronization rasters in the frequency-domain ranges of n38 and n41, the spacing of a synchronization raster defined for n38 is 1, and the spacing of a synchronization raster defined for n41 is 9. Therefore, in the frequency-domain overlapping region of n38 and n41, every ninth synchronization raster in n38 overlaps with a synchronization raster in n41. In an overlapping frequency bandwidth of n38 and n41, an offset is introduced to distinguish n38 and n41 on an overlapping synchronization raster. A specific implementation mode of the offset is similar to the first manner. The difference is that, for the overlapping synchronization rasters of n38 and n41, an offset is introduced to the synchronization raster corresponding to n38 for distinguishing the synchronization raster of n38 from the synchronization raster of n41.

Figure 3:
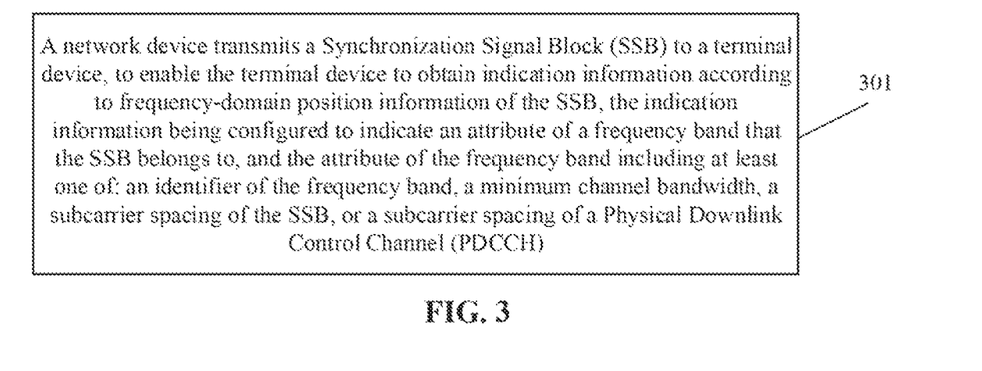
FIG. 3 is a second schematic flowchart of a method of indicating information according to an embodiment of the disclosure.

FIG. 3 is a second schematic flowchart of a method of indicating information according to an embodiment of the disclosure. As illustrated in FIG. 3, the method of indicating information includes the following operation.

In block 301, a network device transmits an SSB to a terminal device, to enable the terminal device to obtain indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a PDCCH.

In the embodiment of the disclosure, the network device may transmit the SSB to the terminal device in the following manners.

A first manner: the network device transmits the SSB to the terminal device on a first synchronization raster, to enable the terminal device to, responsive to detecting that a frequency-domain position of the SSB corresponds to the first synchronization raster, determine that the attribute of the frequency band that the SSB belongs to is an attribute of a first frequency band; or, the network device transmits the SSB to the terminal device on a second synchronization raster, to enable the terminal device to, responsive to detecting that the frequency-domain position of the SSB corresponds to the second synchronization raster, determine that the attribute of the frequency band that the SSB belongs to is an attribute of a second frequency band. Each of the first synchronization raster and the second synchronization raster is a synchronization raster in an overlapping frequency bandwidth of the first frequency band and the second frequency band, a position of the first synchronization raster is determined based on a first formula, and a position of the second synchronization raster is determined based on a second formula.

Specifically, responsive to that the first frequency band and the second frequency band are positioned in a first frequency range, the position of the first synchronization raster is determined based on a formula $N*1,200$ kHz$+M*50$ kHz, $N=1:2,499$, and the position of the second synchronization raster is determined based on a formula $N*1,200$ kHz$+M'*50$ kHz, $N=1:2,499$ or a formula $N*1,200$ kHz$+M*50$ kHz$+$Offset1, $N=1:2,499$, values of M and M' being different and Offset1 being a first offset.

Responsive to that the first frequency band and the second frequency band are positioned in a second frequency range, the position of the first synchronization raster is determined based on a formula $3,000$ Mhz$+N*1.44$ MHz, $N=0:14,756$, and the position of the second synchronization raster is determined based on a formula $3,000$ MHz$+N*1.44$ MHz$+$Offset2, $N=0:14,756$, Offset2 being a second offset.

A second manner: the network device transmits the SSB to the terminal device on a third synchronization raster, to enable the terminal device to, responsive to detecting that the SSB is on the third synchronization raster, determine that the attribute of the frequency band that the SSB belongs to is an attribute of a second frequency band. The third synchronization raster is a synchronization raster in an overlapping bandwidth of the second frequency band and a first frequency band. An overlapping synchronization raster is the third synchronization raster, and the overlapping synchronization raster is an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band.

A third manner: the network device transmits the SSB to the terminal device on the third synchronization raster, to enable the terminal device to, responsive to detecting that the SSB is on the third synchronization raster, determine that the attribute of the frequency band that the SSB belongs to is an attribute of a second frequency band. The third synchronization raster is a synchronization raster in an overlapping bandwidth of the second frequency band and the first frequency band; a position of the third synchronization raster is determined based on a first formula and a second spacing of a synchronization raster corresponding to the second frequency band. Synchronization rasters are determined based on the first formula and a first spacing of a synchronization raster corresponding to the first frequency band, in the overlapping bandwidth. A synchronization raster, except the third synchronization raster, in the synchronization rasters is a synchronization raster corresponding to the first frequency band.

A fourth manner: the network device transmits the SSB to the terminal device on a fourth synchronization raster, to enable the terminal device to, responsive to detecting that the SSB is on the fourth synchronization raster, determine that the attribute of the frequency band that the SSB belongs to is an attribute of a first frequency band. The fourth synchronization raster is a synchronization raster in an overlapping bandwidth of the first frequency band and the second frequency band; the fourth synchronization raster is determined based on a first frequency-domain position and a third offset. An overlapping frequency-domain position is the first frequency-domain position, and the overlapping frequency-domain position is an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band.

In the technical solutions of the embodiments of the disclosure, the terminal device receives the SSB transmitted by the network device, and the terminal device obtains the indication information according to the frequency-domain position information of the SSB, the indication information being configured to indicate the attribute of the frequency band that the SSB belongs to, and the attribute of the frequency band including at least one of: the identifier of the frequency band, the minimum channel bandwidth, the subcarrier spacing of the SSB, or the subcarrier spacing of the PDCCH. With adoption of the technical solutions of the embodiments of the disclosure, through the position of the synchronization raster corresponding to the detected SSB, the terminal may obtain the attribute of the frequency band that the SSB belongs to when detecting the SSB, so that subsequent Remaining Minimum System Information (RMSI) reception may be correctly implemented.

Figure 4:
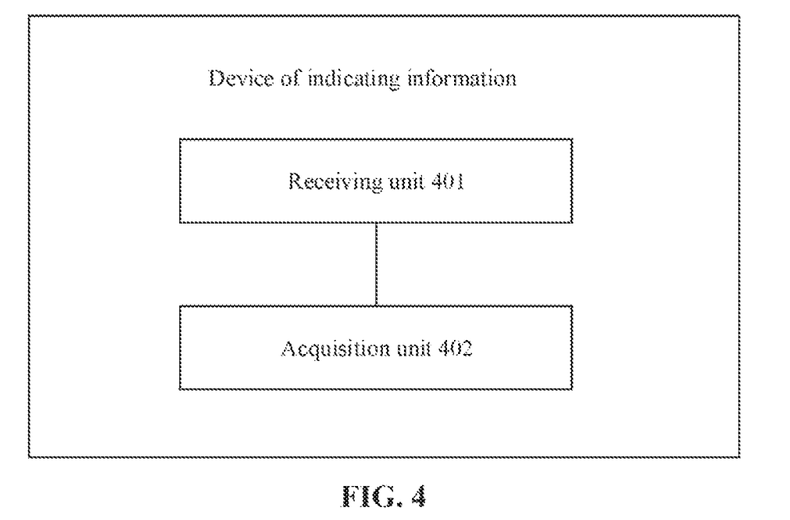
FIG. 4 is a first schematic diagram of structure composition of a device of indicating information according to an embodiment of the disclosure.

FIG. 4 is a first schematic diagram of structure composition of a device of indicating information according to an embodiment of the disclosure. As illustrated in FIG. 4, the device of indicating information includes a receiving unit 401 and an acquisition unit 402.

The receiving unit 401 is configured to receive an SSB transmitted by a network device.

The acquisition unit 402 is configured to obtain indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a PDCCH.

In an implementation mode, the acquisition unit 402 includes a first determination subunit.

The first determination subunit is configured to, responsive to detecting that a frequency-domain position of the SSB corresponds to a first synchronization raster, determine that the attribute of the frequency band that the SSB belongs to is an attribute of a first frequency band, and responsive to detecting that the frequency-domain position of the SSB corresponds to a second synchronization raster, determine that the attribute of the frequency band that the SSB belongs to is an attribute of a second frequency band.

Each of the first synchronization raster and the second synchronization raster is a synchronization raster in an overlapping bandwidth of the first frequency band and the second frequency band, a position of the first synchronization raster is determined based on a first formula, and a position of the second synchronization raster is determined based on a second formula.

Specifically, responsive to that the first frequency band and the second frequency band are positioned in a first frequency range, the position of the first synchronization raster is determined based on a formula $N*1,200$ kHz$+M*50$ kHz, $N=1:2,499$, and the position of the second synchronization raster is determined based on a formula $N*1,200$ kHz$+M'*50$ kHz, $N=1:2,499$ or a formula $N*1,200$ kHz$+M*50$ kHz$+$Offset1, $N=1:2,499$, values of M and M' being different and Offset1 being a first offset.

Responsive to that the first frequency band and the second frequency band are positioned in a second frequency range, the position of the first synchronization raster is determined based on a formula $3,000$ Mhz$+N*1.44$ MHz, $N=0:14,756$, and the position of the second synchronization raster is determined based on a formula $3,000$ MHz$+N*1.44$ MHz$+$Offset2, $N=0:14,756$, Offset2 being a second offset.

In an implementation mode, the acquisition unit 402 includes a second determination subunit.

The second determination subunit is configured to, responsive to detecting that the frequency-domain position of the SSB corresponds to a third synchronization raster, determine that the attribute of the frequency band that the SSB belongs to is an attribute of a second frequency band.

The third synchronization raster is a synchronization raster in an overlapping bandwidth of the second frequency band and a first frequency band; and an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band, is the third synchronization raster.

In an implementation mode, the acquisition unit 402 includes a third determination subunit.

The third determination subunit is configured to, responsive to detecting that the frequency-domain position of the SSB corresponds to the third synchronization raster, determine that the attribute of the frequency band that the SSB belongs to is an attribute of a second frequency band.

The third synchronization raster is a synchronization raster in an overlapping bandwidth of the second frequency band and the first frequency band; a position of the third synchronization raster is determined based on a first formula and a second spacing of a synchronization raster corresponding to the second frequency band; and a synchronization raster, except the third synchronization raster, in the synchronization rasters, which are determined based on the first formula and a first spacing of a synchronization raster corresponding to the first frequency band, in the overlapping bandwidth is a synchronization raster corresponding to the first frequency band.

In an implementation mode, the acquisition unit 402 includes a fourth determination subunit.

The fourth determination subunit is configured to, responsive to detecting that the frequency-domain position of the SSB corresponds to a fourth synchronization raster, determine that the attribute of the frequency band that the SSB belongs to is an attribute of a first frequency band.

The fourth synchronization raster is a synchronization raster in an overlapping bandwidth of the first frequency band and a second frequency band; the fourth synchronization raster is determined based on a first frequency-domain position and a third offset; and an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band, is the first frequency-domain position.

Those skilled in the art should know that functions realized by each unit in the information indication device illustrated in FIG. 4 may be understood with reference to related descriptions about the information indication method. The functions of each unit in the information indication device illustrated in FIG. 4 may be realized through a program running in a processor, and may also be realized through a specific logical circuit.

Figure 5:
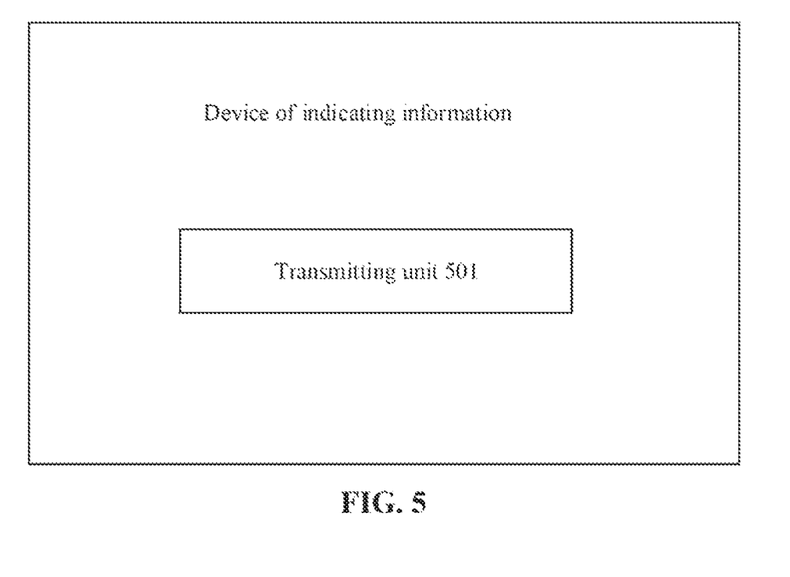
FIG. 5 is a second schematic diagram of structure composition of a device of indicating information according to an embodiment of the disclosure.

FIG. 5 is a second schematic diagram of structure composition of a device of indicating information according to an embodiment of the disclosure. As illustrated in FIG. 5, the device of indicating information includes a transmitting unit 501.

The transmitting unit 501 is configured to transmit an SSB to a terminal device, to enable the terminal device to obtain indication information according to frequency-domain position information of the SSB, the indication information being configured to indicate an attribute of a frequency band that the SSB belongs to, and the attribute of the frequency band including at least one of: an identifier of the frequency band, a minimum channel bandwidth, a subcarrier spacing of the SSB, or a subcarrier spacing of a PDCCH.

In an implementation mode, the transmitting unit 501 includes a first transmitting subunit.

The first transmitting subunit is configured to transmit the SSB to the terminal device on a first synchronization raster, to enable the terminal device to, responsive to detecting that a frequency-domain position of the SSB corresponds to the first synchronization raster, determine that the attribute of the frequency band that the SSB belongs to is an attribute of a first frequency band; or, transmit the SSB to the terminal device on a second synchronization raster, to enable the terminal device to, responsive to detecting that the frequency-domain position of the SSB corresponds to the second synchronization raster, determine that the attribute of the frequency band that the SSB belongs to is an attribute of a second frequency band.

Each of the first synchronization raster and the second synchronization raster is a synchronization raster in an overlapping frequency bandwidth of the first frequency band and the second frequency band, a position of the first synchronization raster is determined based on a first formula, and a position of the second synchronization raster is determined based on a second formula.

Furthermore, responsive to that the first frequency band and the second frequency band are positioned in a first frequency range, the position of the first synchronization raster is determined based on a formula N*1,200 kHz+M*50 kHz, N=1:2,499, and the position of the second synchronization raster is determined based on a formula N*1,200 kHz+M'*50 kHz, N=1:2,499 or a formula N*1,200 kHz+M*50 kHz+Offset1, N=1:2,499, values of M and M' being different and Offset1 being a first offset.

Responsive to that the first frequency band and the second frequency band are positioned in a second frequency range, the position of the first synchronization raster is determined based on a formula 3,000 Mhz+N*1.44 MHz, N=0:14,756, and the position of the second synchronization raster is determined based on a formula 3,000 MHz+N*1.44 MHz+Offset2, N=0:14,756, Offset2 being a second offset.

In an implementation mode, the transmitting unit 501 includes a second transmitting subunit.

The second transmitting subunit is configured to transmit the SSB to the terminal device on a third synchronization raster, to enable the terminal device to, responsive to detecting that the SSB is on the third synchronization raster, determine that the attribute of the frequency band that the SSB belongs to is an attribute of a second frequency band.

The third synchronization raster is a synchronization raster in an overlapping bandwidth of the second frequency band and a first frequency band, and an overlapping synchronization raster of synchronization rasters, which are determined based on a first formula and a first spacing of a synchronization raster corresponding to the first frequency band, and synchronization rasters, which are determined based on the first formula and a second spacing of a synchronization raster corresponding to the second frequency band, is the third synchronization raster.

In an implementation mode, the transmitting unit 501 includes a third transmitting subunit.

The third transmitting subunit is configured to transmit the SSB to the terminal device on the third synchronization raster, to enable the terminal device to, responsive to detecting that the SSB is on the third synchronization raster, determine that the attribute of the frequency band that the SSB belongs to is an attribute of a second frequency band.

The third synchronization raster is a synchronization raster in an overlapping bandwidth of the second frequency band and the first frequency band; a position of the third synchronization raster is determined based on a first formula and a second spacing of a synchronization raster corresponding to the second frequency band; and a synchronization raster, except the third synchronization raster, in the synchronization rasters, which are determined based on the first formula and a first spacing of a synchronization raster corresponding to the first frequency band, in the overlapping bandwidth is a synchronization raster corresponding to the first frequency band.

In an implementation mode, the transmitting unit 501 includes a fourth transmitting subunit.

The fourth transmitting subunit is configured to transmit the SSB to the terminal device on a fourth synchronization raster, to enable the terminal device to, responsive to detecting that the SSB is on the fourth synchronization raster, determine that the attribute of the frequency band that the SSB belongs to is an attribute of a first frequency band.

The fourth synchronization raster is a synchronization raster in an overlapping bandwidth of the first frequency band and the second frequency band; the fourth synchronization raster is determined based on a first frequency-domain position and a third offset; and an overlapping frequency-domain position of frequency-domain positions, which are determined based on a first formula and a first spacing of a synchronization raster corresponding to the first frequency band, and frequency-domain positions, which are determined based on the first formula and a second spacing of a synchronization raster corresponding to the second frequency band, is the first frequency-domain position.

Those skilled in the art should know that functions realized by each unit in the information indication device illustrated in FIG. 5 may be understood with reference to related descriptions about the information indication method. The functions of each unit in the information indication device illustrated in FIG. 5 may be realized through a program running in a processor, and may also be realized through a specific logical circuit.

When being implemented in form of software functional module and sold or used as an independent product, the information indication device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, according to an embodiment of the disclosure, there is also provided a computer storage medium, on which computer-executable instructions are stored, the computer-executable instruction being executed by a processor to implement the method of indicating information of the embodiments of the disclosure.

Figure 6:
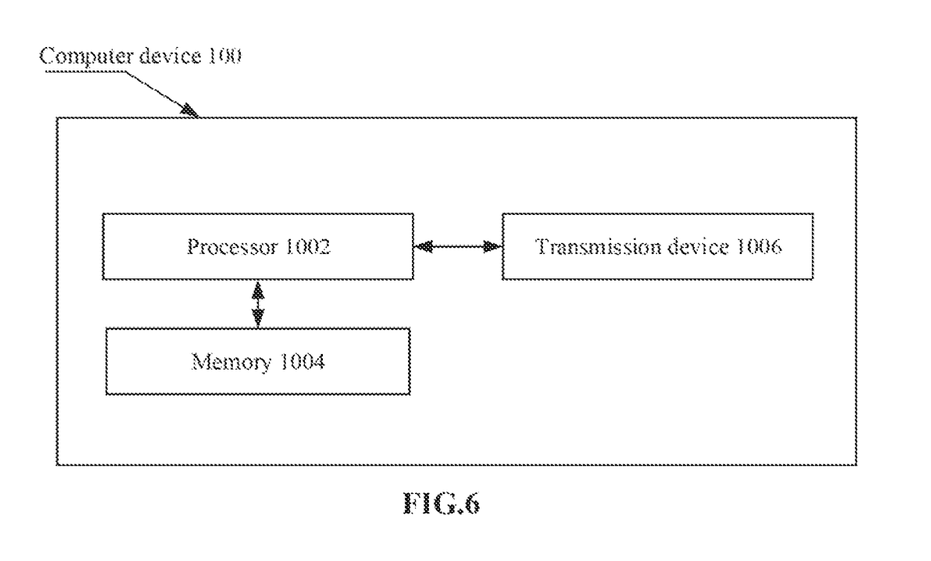
FIG. 6 is a schematic diagram of structure composition of a computer device according to an embodiment of the disclosure.

FIG. 6 is a schematic structure diagram of a computer device according to an embodiment of the disclosure. The computer device may be a terminal, or may be a network device. As illustrated in FIG. 6, the computer device 100 may include one or more (only one is illustrated in the figure) processors 1002 (the processor 1002 may include, but not limited to, a processing device such as a Micro Controller Unit (MCU) or a Field Programmable Gate Array (FPGA)), a memory 1004 configured to store data and a transmission device 1006 configured for a communication function. Those of ordinary skill in the art should know that the structure illustrated in FIG. 6 is only schematic and not intended to limit the structure of the electronic device. For example, the computer device 100 may further include components more or fewer than the components illustrated in FIG. 6 or has a configuration different from that illustrated in FIG. 6.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or transmit data through a network. A specific example of the network may include a wireless network provided by a communication provider of the computer device 100. In an example, the transmission device 1006 includes a Network Interface Controller (NIC), which may be connected with another network device through a base ST, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, or each unit may serve as an independent unit, or two or more than two units may be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method of indicating information, comprising:
receiving, by a terminal device, a Synchronization Signal Block (SSB) transmitted by a network device; and
obtaining, by the terminal device, indication information according to frequency-domain position information of the SSB, the indication information being configured to indicate an attribute of a frequency band that the SSB belongs to, and the attribute of the frequency band comprising at least one of: an identifier of the frequency band, a minimum channel bandwidth, a subcarrier spacing of the SSB, or a subcarrier spacing of a Physical Downlink Control Channel (PDCCH);

wherein obtaining, by the terminal device, the indication information according to the frequency-domain position information of the SSB comprises:

responsive to detecting that the frequency-domain position of the SSB corresponds to a third synchronization raster, determining, by the terminal device, that the attribute of the frequency band that the SSB belongs to is an attribute of a second frequency band, wherein the third synchronization raster is a synchronization raster in an overlapping bandwidth of the second frequency band and a first frequency band; a position of the third synchronization raster is determined based on a first formula and a second spacing of a second synchronization raster corresponding to the second frequency band; and a synchronization raster, except the third synchronization raster, in synchronization rasters, which are determined based on the first formula and a first spacing of a first synchronization raster corresponding to the first frequency band, in the overlapping bandwidth is a synchronization raster corresponding to the first frequency band.

2. The method of claim 1, wherein obtaining, by the terminal device, the indication information according to the frequency-domain position information of the SSB further comprises:

responsive to detecting that a frequency-domain position of the SSB corresponds to the first synchronization raster, determining, by the terminal device, that the attribute of the frequency band that the SSB belongs to is an attribute of the first frequency band;

responsive to detecting that the frequency-domain position of the SSB corresponds to the second synchronization raster, determining, by the terminal device, that the attribute of the frequency band that the SSB belongs to is an attribute of the second frequency band, wherein each of the first synchronization raster and the second synchronization raster is a synchronization raster in the overlapping bandwidth of the first frequency band and the second frequency band, a position of the first synchronization raster is determined based on the first formula, and a position of the second synchronization raster is determined based on a second formula;

wherein responsive to that the first frequency band and the second frequency band are positioned in a first frequency range, the position of the first synchronization raster is determined based on a formula $N*1,200$ kHz+$M*50$ kHz, $N=1:2,499$, and the position of the second synchronization raster is determined based on a formula $N*1,200$ kHz+$M'*50$ kHz, $N=1:2,499$ or a formula $N*1,200$ kHz+$M*50$ kHz+Offset1, $N=1:2,499$, values of M and M' being different and Offset1 being a first offset;

responsive to that the first frequency band and the second frequency band are positioned in a second frequency range, the position of the first synchronization raster is determined based on a formula $3,000$ MHz+$N*1.44$ MHz, $N=0;14,756$, and the position of the second synchronization raster is determined based on a formula $3,000$ MHz+$N*1.44$MHz+Offset2, $N=0:14,756$, Offset2 being a second offset.

3. The method of claim 1, wherein obtaining, by the terminal device, the indication information according to the frequency-domain position information of the SSB further comprises:

responsive to detecting that the frequency-domain position of the SSB corresponds to a fourth synchronization raster, determining, by the terminal device, that the attribute of the frequency band that the SSB belongs to is an attribute of a first frequency band, wherein the fourth synchronization raster is a synchronization raster in the overlapping frequency bandwidth of the first frequency band and the second frequency band; the fourth synchronization raster is determined based on a first frequency-domain position and a third offset; and an overlapping frequency-domain position of frequency-domain positions, which are determined based on the first formula and the first spacing of the first synchronization raster corresponding to the first frequency band, and frequency-domain positions, which are determined based on the first formula and the second spacing of the second synchronization raster corresponding to the second frequency band, is the first frequency-domain position.

4. A method of indicating information, comprising:

transmitting, by a network device, a Synchronization Signal Block (SSB) to a terminal device, to enable the terminal device to obtain indication information according to frequency-domain position information of the SSB, the indication information being configured to indicate an attribute of a frequency band that the SSB belongs to, and the attribute of the frequency band comprising at least one of, an identifier of the frequency band, a minimum channel bandwidth, a subcarrier spacing of the SSB, or a subcarrier spacing of a Physical Downlink Control Channel (PDCCH);

wherein transmitting, by the network device, the SSB to the terminal device comprises:

transmitting, by the network device, the SSB to the terminal device on a third synchronization raster, to enable the terminal device to, responsive to detecting that the SSB is on the third synchronization raster, determine that the attribute of the frequency band that the SSB belongs to is an attribute of a second frequency band, wherein the third synchronization raster is a synchronization raster in an overlapping bandwidth of the second frequency band and a first frequency band; a position of the third synchronization raster is determined based on a first formula and a second spacing of a second synchronization raster corresponding to the second frequency band; and a synchronization raster, except the third synchronization raster, in synchronization rasters, which are determined based on the first formula and a first spacing of a first synchronization raster corresponding to the first frequency band, in the overlapping bandwidth is a synchronization raster corresponding to the first frequency band.

5. The method of claim 4, wherein transmitting, ley the network device, the SSB to the terminal device further comprises:

transmitting, by the network device, the SSB to the terminal device on the first synchronization raster, to enable the terminal device to, responsive to detecting that a frequency-domain position of the SSB corresponds to the first synchronization raster, determine that the attribute of the frequency hand that the SSB belongs to is an attribute of the first frequency band; or transmitting, by the network device, the SSB to the terminal device on the second synchronization raster, to enable the terminal device to, responsive to detecting that the frequency-domain position of the SSB corresponds to the second synchronization raster, determine that the attribute of the frequency band that the SSB belongs to is an attribute of the second frequency band,
wherein each of the first synchronization raster and the second synchronization raster is a synchronization raster in the overlapping bandwidth of the first frequency band and the second frequency band, a position of the first synchronization raster is determined based on the first formula, and a position of the second synchronization raster is determined based on a second formula;
wherein responsive to that the first frequency band and the second frequency band are positioned in a first frequency range, the position of the first synchronization raster is determined based on a formula N*1,200 kHz+M*50 kHz, N=1:2,499, and the position of the second synchronization raster is determined based on a formula N*1,200 kHz+M'*50 kHz, N=1:2,499 or a formula N*1,200 kHz+M*50 kHz+Offset1, N=1:2,499, values of M and M' being different and Offset1 being a first offset;
responsive to that the first frequency band and the second frequency band are positioned in a second frequency range, the position of the first synchronization raster is determined based on a formula 3,000 MHz+N*1.44 MHz, N=0;14,756, and the position of the second synchronization raster is determined based on a formula 3,000 MHz+N*1.44MHz+Offset2, N=0:14,756, Offset2 being a second offset.

6. The method of claim 4, wherein transmitting, by the network device, the SSB to the terminal device further comprises:
transmitting, by the network device, the SSB to the terminal device on a fourth synchronization raster, to enable the terminal device to, responsive to detecting that the SSI is on the fourth synchronization raster, determine that the attribute of the frequency band that the SSB belongs to is an attribute of a first frequency band,
wherein the fourth synchronization raster is a synchronization raster in the overlapping bandwidth of the first frequency band and the second frequency band; the fourth synchronization raster is determined based on a first frequency-domain position and a third offset; and an overlapping frequency-domain position of frequency-domain positions, which are determined based on the first formula and the first spacing of the first synchronization raster corresponding to the first frequency band, and frequency-domain positions, which are determined based on the first formula and the second spacing of the second synchronization raster corresponding to the second frequency band, is the first frequency-domain position.

7. A device of indicating information, comprising a memory, a transmission device and a processor, wherein
the memory is configured to store a software program capable of running on the processor; and
the transmission device is configured to receive a Synchronization Signal Block (SSB) transmitted by a network device; and
the processor is configured to obtain indication information according to frequency-domain position information of the SSB, the indication information being configured to indicate an attribute of a frequency band that the SSB belongs to, and the attribute of the frequency band comprising at least one of: an identifier of the frequency band, a minimum channel bandwidth, a subcarrier spacing of the SSB, or a subcarrier spacing of a Physical Downlink Control Channel (PDCCH);
wherein the processor is further configured to:
responsive to detecting that the frequency-domain position of the SSB corresponds to a third synchronization raster, determine that the attribute of the frequency band that the SSB belongs to is an attribute of a second frequency band,
wherein the third synchronization raster is a synchronization raster in an overlapping bandwidth of the second frequency band and the first frequency band; a position of the third synchronization raster is determined based on a first formula and a second spacing of a second synchronization raster corresponding to the second frequency band; and a synchronization raster, except the third synchronization raster, in synchronization rasters, which are determined based on the first formula and a first spacing of a first synchronization raster corresponding to the first frequency band, in the overlapping bandwidth is a synchronization raster corresponding to the first frequency band.

8. The device of claim I I, wherein the processor is further configured to:
responsive to detecting that a frequency-domain position of the SSB corresponds to the first synchronization raster, determine that the attribute of the frequency band that the SSB belongs to is an attribute of the first frequency band, and responsive to detecting that the frequency-domain position of the SSB corresponds to the second synchronization raster, determine that the attribute of the frequency band that the SSB belongs to is an attribute of the second frequency band,
wherein each of the first synchronization raster and the second synchronization raster is a synchronization raster in the overlapping bandwidth of the first frequency band and the second frequency band, a position of the first synchronization raster is determined based on the first formula, and a position of the second synchronization raster is determined based on a second formula;
wherein responsive to that the first frequency band and the second frequency band are positioned in a first frequency range, the position of the first synchronization raster is determined based on a formula N*1,200 kHz+M*50 kHz, N=1:2,499, and the position of the second synchronization raster is determined based on a formula N*1,200 kHz+M'*50 kHz, N=1:2,499 or a formula N*1,200 kHz+M*50 kHz+Offset1, N=1:2,499, values of M and M' being different and Offset1 being a first offset;
responsive to that the first frequency band and the second frequency band are positioned in a second frequency range, the position of the first synchronization raster is determined based on a formula 3,000 MHz+N*1.44 MHz, N=0;14,756, and the position of the second synchronization raster is determined based on a formula 3,000 MHz+N*1.44MHz+Offset2, N=0:14,756, Offset2 being a second offset.

9. The device of claim 7, wherein the processor is further configured to:
responsive to detecting that the frequency-domain position of the SSB corresponds to a fourth synchronization raster, determine that the attribute of the frequency band that the SSB belongs to is an attribute of a first frequency band,
wherein the fourth synchronization raster is a synchronization raster in the overlapping bandwidth of the first frequency band and the second frequency band; the fourth synchronization raster is determined based on a first frequency-domain position and a third offset; and an overlapping frequency-domain position of frequency-domain positions, which are determined based on the first formula and the first spacing of the first synchronization raster corresponding to the first frequency band, and frequency-domain positions, which are determined based on the first formula and the second spacing of the second synchronization raster corresponding to the second frequency band, is the first frequency-domain position.

10. A device of indicating information, comprising a transmission device, wherein the transmission device is configured to transmit a Synchronization Signal Block (SSB) to a terminal device, to enable the terminal device to obtain indication information according to frequency-domain position information of the SSB, the indication information being configured to indicate an attribute of a frequency band that the SSB belongs to, and the attribute of the frequency band comprising at least one of: an identifier of the frequency band, a minimum channel bandwidth, a subcarrier spacing of the SSB, or a subcarrier spacing of a Physical Downlink Control Channel (PDCCH):

wherein the transmission device is further configured to:

transmit the SSB to the terminal device on a third synchronization raster, to enable the terminal device to, responsive to detecting that the SSB is on the third synchronization raster, determine that the attribute of the frequency hand that the SSB belongs to is an attribute of a second frequency band, wherein the third synchronization raster is a synchronization raster in an overlapping bandwidth of the second frequency band and the first frequency hand; a position of the third synchronization raster is determined based on a first formula and a second spacing of a second synchronization raster corresponding to the second frequency band; and a synchronization raster, except the third synchronization raster, in synchronization rasters, which are determined based on the first formula and a first spacing of a first synchronization raster corresponding to the first frequency band, in the overlapping frequency bandwidth is a synchronization raster corresponding to the first frequency band.

11. The device of claim 10, wherein the transmission device is further configured to:

transmit the SSB to the terminal device on the first synchronization raster, to enable the terminal device to, responsive to detecting that a frequency-domain position of the SSB corresponds to the first synchronization raster, determine that the attribute of the frequency band that the SSB belongs to is an attribute of the first frequency band; or transmit the SSB to the terminal device on the second synchronization raster, to enable the terminal device to, responsive to detecting that the frequency-domain position of the SSB corresponds to the second synchronization raster, determine that the attribute of the frequency band that the SSB belongs to is an attribute of the second frequency band, wherein each of the first synchronization raster and the second synchronization raster is a synchronization raster in the overlapping bandwidth of the first frequency band and the second frequency band, a position of the first synchronization raster is determined based on the first formula and a position of the second synchronization raster is determined based on a second formula;

wherein responsive to that the first frequency band and the second frequency band are positioned in a first frequency range, the position of the first synchronization raster is determined based on a formula $N*1{,}200\text{ kHz} + M*50\text{ kHz}$, $N=1{:}2{,}499$, and the position of the second synchronization raster is determined based on a formula $N*1{,}200\text{ kHz} + M'*50\text{ kHz}$, $N=1{:}2{,}499$ or a formula $N*1{,}200\text{ kHz} + M*50\text{ kHz} + \text{Offset1}$, $N=1{:}2{,}499$, values of M and M' being different and Offset1 being a first offset;

responsive to that the first frequency band and the second frequency band are positioned in a second frequency range, the position of the first synchronization raster is determined based on a formula $3{,}000\text{ MHz} + N*1.44\text{ MHz}$, $N=0{;}14{,}756$, and the position of the second synchronization raster is determined based on a formula $3{,}000\text{ MHz} + N*1.44\text{MHz} + \text{Offset2}$, $N=0{:}14{,}756$, Offset2 being a second offset.

12. The device of claim 10, wherein the transmission device is further configured to:

transmit the SSB to the terminal device on a fourth synchronization raster, to enable the terminal device to, responsive to detecting that the SSB is on the fourth synchronization raster, determine that the attribute of the frequency band that the SSB belongs to is an attribute of a first frequency band, wherein the fourth synchronization raster is a synchronization raster in the overlapping bandwidth of the first frequency band and the second frequency band; the fourth synchronization raster is determined based on a first frequency-domain position and a third offset; and an overlapping frequency-domain position of frequency-domain positions, which are determined based on first formula and the first spacing of the first synchronization raster corresponding to the first frequency band, and frequency-domain positions, which are determined based on the first formula and the second spacing of the second synchronization raster corresponding to the second frequency band, is the first frequency-domain position.

* * * * *